Patented May 13, 1924.

1,494,085

UNITED STATES PATENT OFFICE.

SAMUEL A. TURNER, OF BROOKLYN, NEW YORK, ASSIGNOR TO PATHÉ CHEMICAL COMPANY, OF BROOKLYN, NEW YORK, A CORPORATION OF DELAWARE.

MOTH-REPELLENT ANIMAL FIBER.

No Drawing. Application filed June 15, 1923. Serial No. 645,695.

*To all whom it may concern:*

Be it known that I, SAMUEL A. TURNER, a citizen of the United States, residing at Brooklyn, county of Kings, city of New York, and State of New York, have invented new and useful Improvements in Moth-Repellent Animal Fibers, of which the following is a full, clear, and exact specification.

My invention relates to a process for treating textile fibers and refers particularly to processes for treating animal fibers and fabrics, in order to render them immune against the attacks of certain insects and to the fibers and fabrics thus produced.

It is well known that animal fibers, such as wool, are subject to attacks from various insects and are particularly liable to be eaten and destroyed by moths.

Various methods are employed for the prevention of such devastating actions, but they are generally only temporary in character and ineffective in results.

It has long been recognized that it is highly desirable that the animal fibers and fabrics should themselves possess the property of repelling such attacks without the necessity of employment of repeated protective means at intermittent periods of time when the fibers or fabrics are not in actual use.

Attempts have therefore been made to incorporate within the fibers some means for their protection against such insect devastation which will be lasting in character, not removed during the ordinary process of fiber use and which will not affect the desirable properties of the fiber.

It is evident from a consideration of the various animal fibers, their numerous and widely different properties and the many uses to which they are applied, that the production of an insect repellent animal fiber of considerable permanency is difficult of accomplishment.

The process of my invention presents a means of accomplishing these desirable results, producing an insect repellent animal fiber without injury to the fiber itself and which is not affected by the ordinary uses to which the fiber or fabric produced therefrom is applied.

My process also possesses the valuable properties of being economic and of easy application without the employment of expensive materials or elaborate machinery.

I have found that if animal fibers be impregnated with the solution resulting from the intermixture of a sulphate and a metallic fluoride, especially in the presence of certain organic salts, the fibers thus treated and dried have the property of being immune from the attacks of moths in all stages of the life growth of such insects and that this valuable property is obtained without sacrificing any of the inherent characteristics of the fiber.

I have found in general way that compounds suitable for the described purposes may be produced by the interaction of salts of the sulphonic acid of naphthalene, especially the metallic salts of the mono-sulphonic acids, sulphates, especially the metallic sulphates, and compounds of fluorine.

Among the compounds which I have found particularly adaptable to my process are the aluminium and zinc salts of naphthalene-alpha-mono-sulphonic acid and napththalene-beta-mono-sulphonic acid; aluminium and zinc sulphates; and the fluorides of aluminium, zinc, sodium, potassium and ammonium, although my invention is not limited to the particular mentioned compounds, as others may be substituted therefor.

In a general way, the application of my wool-proofing compounds consists in treating the well cleansed wool with formic acid and then treating it with a solution of my compounds and drying, although this specific method may be varied without going beyond the scope of my invention.

Wool thus treated possesses all of its original physical characteristics and is practically permanently resistant to moths and their larvæ.

The following is given as one method of producing insect resistant animal fibers by my process.

I dissolve 20 parts by weight of zinc beta-mono-sulphonate of naphthalene in 200 parts by weight of water, to this solution I add, preferably slowly, 56 parts by weight of zinc sulphate ($ZnSO_4.7H_2O$) and stir at a gentle boil until it is dissolved. I then add 24 parts by weight of ammonium fluoride ($NH_4Fl$) and maintain the boiling temperature until it is dissolved. The liquid is then filtered, evaporated to dryness and ground, preferably into a very fine powder. Aqueous solutions of the zinc sulphate and aluminium fluoride may be substituted for the solids mentioned above.

The resulting compounds from the above example process may be applied to the wool as follows:—

The wool is thoroughly cleansed, as, for example, by scouring with potassium carbonate and ammonia at 60° C. for one hour and then well rinsed, and is then worked for one-half hour in a solution containing 10% of formic acid 85% estimated upon the weight of the wool. The thus treated wool is then introduced into an aqueous solution containing 20% of the above example compounds estimated upon the weight of the wool and worked therein for two hours at a temperature of 25° C. to 30° C. The treated wool is then removed, well rinsed with water and dried at about 70° C.

Both the formic acid bath and the wool resistant compounds bath may be employed for future wool treatments, in which event 2½% formic acid 85%, estimated upon the weight of the wool and 2½% wool resistant compounds estimated upon the weight of the wool, may be added to the respective baths.

While I have employed formic acid in the above example, this particular acid is not essential to the production of my treated fibers and it may be replaced by any other suitable acid.

I do not limit myself to the particular chemicals, amounts, temperatures, times of treatment, or steps of process described above, as these are given simply as a means for clearly describing my invention.

What I claim is:—

1. An insect repellent animal fiber having incorporated therein the products resulting from the aqueous inter-action of a salt of naphthalene sulphonic acid, a sulphate and a metallic fluoride.

2. An insect repellent animal fiber having incorporated therein the products resulting from the aqueous inter-action of a metallic salt of naphthalene sulphonic acid, a sulphate and a metallic fluoride.

3. An insect repellent animal fiber having incorporated therein the products resulting from the aqueous inter-action of zinc salt naphthalene sulphonic acid, a sulphate and a metallic fluoride.

4. An insect repellent animal fiber having incorporated therein the products resulting from the aqueous inter-action of a salt of naphthalene sulphonic acid, a sulphate and aluminium fluoride.

5. An insect repellent animal fiber having incorporated therein the products resulting from the aqueous inter-action of a salt of naphthalene sulphonic acid, zinc sulphate and a metallic fluoride.

6. An insect repellent animal fiber having incorporated therein the products resulting from the aqueous inter-action of a salt of naphthalene sulphonic acid, zinc sulphate and aluminium fluoride.

7. An insect repellent animal fiber having incorporated therein the products resulting from the aqueous inter-action of a metallic salt of naphthalene sulphonic acid, zinc sulphate and a metallic fluoride.

8. An insect repellent animal fiber having incorporated therein the products resulting from the aqueous inter-action of a metallic salt of naphthalene sulphonic acid, zinc sulphate and aluminium fluoride.

9. An insect repellent animal fiber having incorporated therein the products resulting from the aqueous inter-action of zinc salt of naphthalene sulphonic acid, zinc sulphate and aluminium fluoride.

Signed at New York city, in the county of New York and State of New York, this 14th day of June, 1923.

SAMUEL A. TURNER.